United States Patent [19]
Nishio et al.

[11] Patent Number: 6,021,006
[45] Date of Patent: Feb. 1, 2000

[54] OPTICAL SYSTEM HAVING COMPOSITE PRISM

[75] Inventors: Etsuro Nishio; Yutaka Kamijo; Isamu Hirai, all of Tokyo, Japan

[73] Assignee: Asahi Kogaku Kogyo Kabushiki Kaisha, Tokyo, Japan

[21] Appl. No.: 08/966,583

[22] Filed: Nov. 10, 1997

[30] Foreign Application Priority Data

Nov. 12, 1996 [JP] Japan ................................. 8-315504

[51] Int. Cl.[7] .............. G02B 7/02; G02B 5/04; G03B 19/12
[52] U.S. Cl. .............. 359/819; 359/831; 396/354
[58] Field of Search .................. 359/625, 638, 359/640, 833, 834, 831, 836, 837, 819; 396/354, 384, 386

[56] References Cited

U.S. PATENT DOCUMENTS

| | | | |
|---|---|---|---|
| 3,562,149 | 2/1971 | Suzuki et al. | 95/42 |
| 3,599,630 | 8/1971 | Sato et al. | 600/109 |
| 3,603,670 | 9/1971 | Kim | 350/265 |
| 3,675,558 | 7/1972 | Kuramoto et al. | 396/384 |
| 4,081,807 | 3/1978 | Urano et al. | 354/152 |
| 4,231,649 | 11/1980 | Kimura et al. | 396/384 |
| 4,278,339 | 7/1981 | Uchida et al. | 354/155 |
| 4,297,020 | 10/1981 | Yamada et al. | 396/384 |
| 4,609,272 | 9/1986 | Yokota et al. | 396/384 |
| 5,250,969 | 10/1993 | Abe et al. | 354/219 |
| 5,452,119 | 9/1995 | Morimoto et al. | 359/196 |
| 5,526,083 | 6/1996 | Misawa | 355/225 |
| 5,579,191 | 11/1996 | Alexander et al. | 360/132 |

FOREIGN PATENT DOCUMENTS 1263307   2/1972   United Kingdom.

*Primary Examiner*—Georgia Epps
*Assistant Examiner*—Ricky Mack
*Attorney, Agent, or Firm*—Greenblum & Bernstein P.L.C.

[57] ABSTRACT

An optical system comprises a pentagonal roof prism and a transparent plate. A rear surface of the pentagonal roof prism is provided with a triangular recessed portion. The wall of the recessed portion is frosted. The transparent plate is a triangular plate, slightly smaller than that of the recessed portion, and is applied to the wall of the recessed portion. The obverse face of the transparent plate is a transparent or polished surface. The transparent plate is applied to the recessed portion with adhesive having photo-transmissibility. It is preferable that the adhesive does not shrink when hardening.

9 Claims, 2 Drawing Sheets

OPTICAL SYSTEM HAVING COMPOSITE PRISM

BACKGROUND OF THE INVENTION

1. Field of the Invention

The present invention relates to a pentagonal roof prism mounted in a single-lens reflex camera and, more particularly, to an improvement of a structure of an optical system provided for carrying out photometry before a photographing operation.

2. Description of the Related Art

Conventionally, there is known a pentagonal roof prism of a single-lens reflex camera, which serves as a part of a photometry optical system. Namely, a photoreceptor element for photometry is disposed behind a rear surface of the pentagonal roof prism, close to an eyepiece lens of the viewfinder optical system, and a condenser lens is interposed between the rear surface and the photoreceptor. Thus, a light beam passes through a focusing glass of the viewfinder, is reflected by an inner plane of the pentagonal roof prism, and emerges from the rear surface to become incident on the photoreceptor, so that a photometry value is sensed.

As described above, the pentagonal prism has a surface which should be a transparent surface so that a light beam is led to a photoreceptor, for example. However, depending upon the shape of the pentagonal prism, it is difficult to polish the surface to obtain a transparent surface, since a conventional tool for polishing a surface of a prism will barely fit on the surface.

SUMMARY OF THE INVENTION

Therefore, an object of the invention is to provide an optical system in which a surface of a prism is easily produced with a transparent surface while suppressing the manufacturing cost.

According to the present invention, there is provided an optical system comprising a prism made of glass, which has a frosted wall, and a transparent plate having at least one transparent surface. The transparent plate is applied to the wall with adhesive having photo-transmissibility in such a manner that the transparent surface faces outward from the prism.

Further, according to the present invention, there is provided a prism made of glass, comprising a wall which is frosted, and a plate which is applied to the wall with adhesive having photo-transmissibility. The plate has a transparent surface facing in an opposite direction to the prism.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
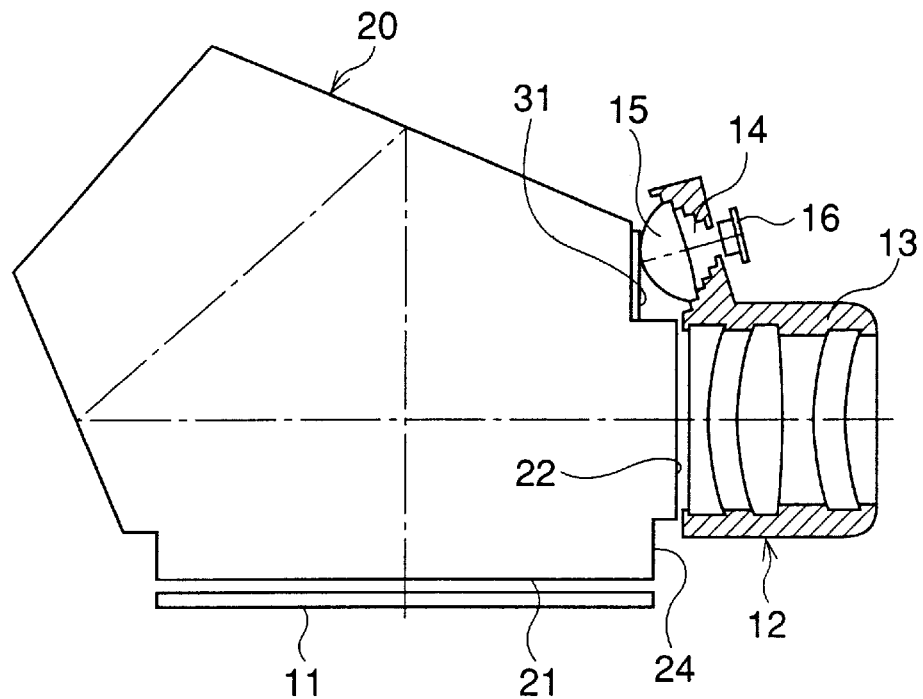
FIG. 1 is a partially sectional view showing a pentagonal roof prism and a construction around the pentagonal roof prism, to which an embodiment of the present invention is applied.

The present invention will be described below with reference to embodiments shown in the drawings.

FIG. 1 shows a viewfinder optical system mounted in a single-lens reflex camera to which an embodiment of the present invention is applied.

A focusing glass 11 faces the incident surface 21 provided on an undersurface of a pentagonal roof prism 20 which is made of glass. An eyepiece unit 12 faces the emergent plane 22 provided on a rear surface of the pentagonal roof prism 20. The eyepiece unit 12 has a housing, which is provided with an opening 14 at an upper portion thereof, in which a condenser lens 15 is housed. A photoreceptor 16 is disposed behind the opening 14 so that a photometry value is sensed.

An object image obtained through a photographing optical system (not shown) is formed on the focusing glass 11. Light passing through the focusing glass 11 is reflected by a reflection plane of the pentagonal roof prism 20, and enters the eyepiece unit 12 after emerging from the emergent plane 22, so that the object image can be observed through the eyepiece unit 12. The light passing through the focusing glass 11 is reflected by the reflection plane of the pentagonal roof prism 20, and is condensed by the condenser lens 15 to enter the photoreceptor 16. Namely, the pentagonal roof prism 20 serves as a part of the photometry optical system in addition to the viewfinder optical system.

Figure 2:
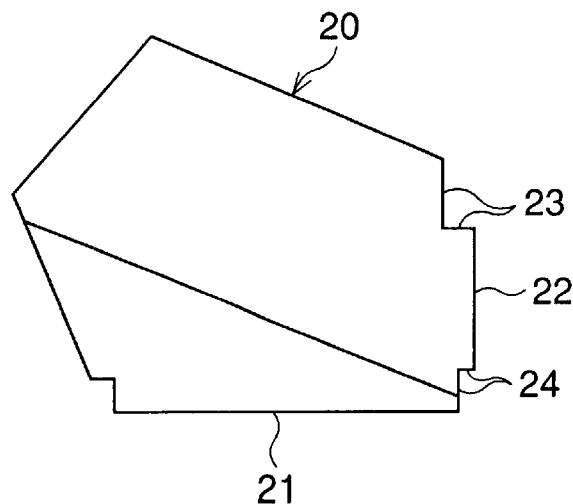
FIG. 2 is a side view showing the pentagonal prism.
Figure 3:
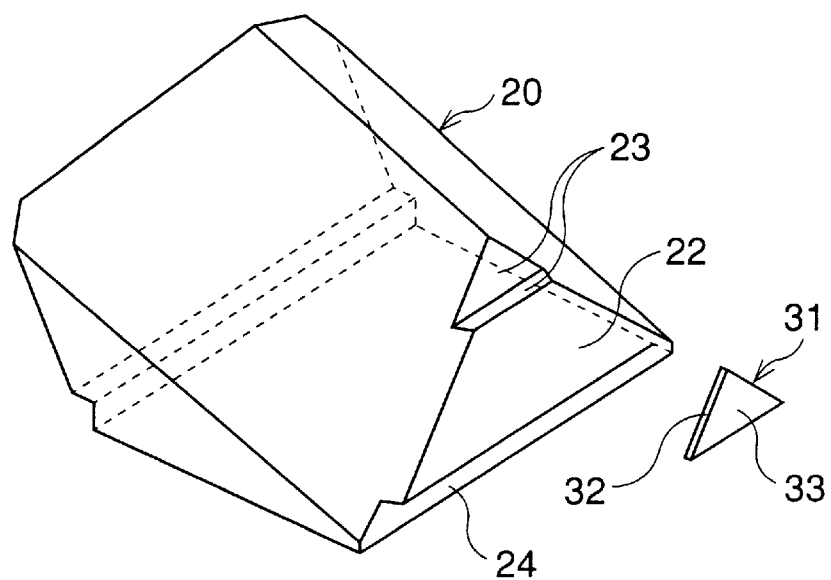
FIG. 3 is a perspective view showing the pentagonal prism and a transparent plate which are disassembled from each other.
Figure 4:
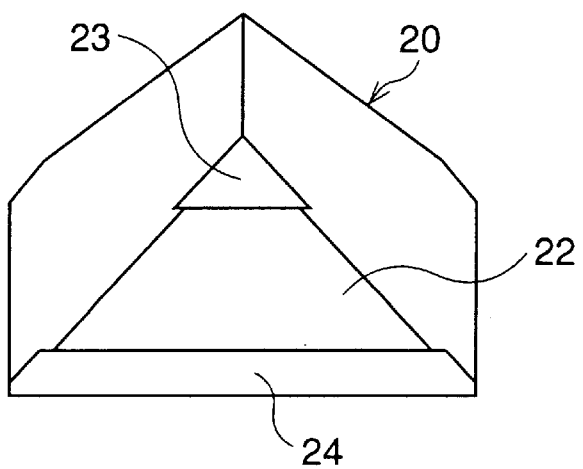
FIG. 4 is a rear view showing the pentagonal prism.

As shown in FIGS. 2 through 4, the rear surface of the pentagonal roof prism 20 is approximately triangular, and incorporates the trapezoidal emergent plane 22, which faces the eyepiece unit 12 (see FIG. 1), a first recessed portion 23 formed above the emergent plane 22, and a second recessed portion 24 formed beneath the emergent plane 22. These recessed portions 23 and 24 are adjacent to and recessed relative to the emergent plane 22. The depth of the first recessed portion 23 is greater than that of the second recessed portion 24, the depth being calculated in a direction parallel to the optical axis of the eyepiece unit 12. The first recessed portion 23 is triangular, creating similar triangles with the rear surface of the pentagonal roof prism 20. The second recessed portion 24 is a strip-shaped hexagon extending parallel to the focusing glass 11.

The second recessed portion 24 is formed in such a manner that a vertical wall, which is perpendicular to the incident surface 21, is positioned at the edge of the focusing glass 11 as understood from FIG. 1. The depth of the first recessed portion 23 can be set to be as large as possible provided any effective luminous flux entering through the focusing glass 11 is not eclipsed.

While the emergent plane 22 is ground and polished to create a transparent surface, the first and second recessed portions 23 and 24 are not polished. Namely, the vertical and horizontal walls of the recessed portions 23 and 24 are frosted.

A transparent plate 31, which is a plane-parallel plate made of glass, is applied to the triangular wall of the first recessed portion 23. The transparent plate 31 is triangular, slightly smaller than that of the triangular wall, and has a thickness which is less than the depth of the recessed portion 23. The transparent plate 31 has an obverse face 33, which is a transparent (i.e. ground and polished) plane, and a reverse face 32, which may be either a transparent plane or a frosted (i.e. non-polished) plane. The reverse face 32 is applied to the triangular wall of the first recessed portion 23 with adhesive which exhibits photo-transmissibility. It is preferable that the adhesive does not substantially shrink when hardening.

Thus, by applying the transparent plate 31, which has the transparent obverse face 33, to the wall of the recessed portion 23, with the adhesive having photo-transmissibility, a transparent plane is easily produced on the recessed portion 23. Further, the condenser lens 15 of the photometry optical system is disposed close to and facing the transparent plate 31. Accordingly, substantially all of the light reflected by the object to be photographed enters the photoreceptor 16 for photometry, thereby ensuring that the photometry value of the object can be sensed with a high accuracy.

Furthermore, the condenser lens 15 is disposed closer to the pentagonal roof prism 20, in comparison with a conventional device in which the pentagonal roof prism 20 does not have the first recessed portion 23. As a result, an area of the emergent plane facing the condenser lens 15 becomes larger in comparison with the conventional device, so that an increased proportion of the light entering the pentagonal prism 20 can be directed, via the condenser lens 15, to the photoreceptor 16, and thus, photometry can be performed with a greater accuracy and also at a lower luminance.

As described above, in the embodiment, since the transparent plate 31, which has a thickness less than the depth of the recessed portion 23 and has the transparent obverse face 33, is applied to the wall of the recessed portion 23 of the pentagonal roof prism 20, the condenser lens 15 can be disposed substantially in the first recessed portion 23. Therefore, light, the amount of which is enough to sense the photometry value of the object to be photographed, is lead to the photoreceptor 16, so that the photometry can be performed with a high accuracy.

Further, since the embodiment is constructed in such a manner that the transparent plane is produced by applying the thin transparent plate 31 to the recessed portion 23, a polishing process carried out on the surface of the pentagonal roof prism 20 can be minimized as much as possible, and thus, the manufacturing cost for the optical system provided in the pentagonal roof prism 20 and the portion around the prism 20 can be suppressed.

Note that the present invention is not restricted to a prism having a specific shape, although the pentagonal roof prism 20 is utilized in the embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-315504 (filed on Nov. 12, 1996) which is expressly incorporated herein by reference, in its entirety.

We claim:

1. An optical system comprising:

a prism made of glass, and having a wall which is frosted;

a transparent plate having at least one transparent surface, said transparent plate being applied to said wall with adhesive having photo-transmissibility in such a manner that said transparent surface faces outward from said prism; and wherein said wall is recessed relative to a surface of said prism, said surface of said prism being adjacent to said wall.

2. An optical system according to claim 1, wherein said transparent plate has a thickness which is less than that by which said wall is recessed.

3. An optical system according to claim 1, wherein said prism comprises a rear surface having said wall and an emergent plane adjacent to said wall, said wall being recessed relative to said emergent plane.

4. An optical system according to claim 1, wherein said prism is a pentagonal roof prism.

5. An optical system according to claim 1, wherein said adhesive does not substantially shrink when hardening.

6. An optical system according to claim 1, wherein said prism is mounted in a photometry optical system of a camera.

7. An optical system according to claim 6, wherein said transparent plate is disposed between said prism and said photometry optical system.

8. An optical system comprising:

a prism made of glass, and having a wall which is frosted;

a transparent plate having at least one transparent surface, said transparent plate being applied to said wall with adhesive having photo-transmissibility in such a manner that said transparent surface faces outward from said prism to define a transparent plane; and wherein said prism is mounted in a photometry optical system of a camera, said photometry optical system having a photoreceptor, and said transparent plate is disposed between said prism and said photoreceptor of said photometry optical system.

9. A prism made of glass, comprising:

a wall which is frosted;

a plate applied to said wall with adhesive having photo-transmissibility, said plate having a transparent surface facing in an opposite direction to said prism; and wherein said wall is recessed relative to a surface of said prism, said surface of said prism being adjacent to said wall.

* * * * *